(12) United States Patent
Obata et al.

(10) Patent No.: US 6,309,590 B1
(45) Date of Patent: Oct. 30, 2001

(54) PRODUCTION PROCESS OF A HEXAGONAL HONEYCOMB STRUCTURE

(75) Inventors: Takasi Obata, Kariya; Yosiyasu Andou, Nagoya; Kazuhiko Yasuda, Oogaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/372,124

(22) Filed: Aug. 11, 1999

(30) Foreign Application Priority Data

Sep. 29, 1998 (JP) .................................................. 10-274680
May 20, 1999 (JP) .................................................. 11-139872

(51) Int. Cl.[7] ..................................................... B28B 3/20
(52) U.S. Cl. .................... 264/630; 264/177.12; 264/631; 264/671
(58) Field of Search .................. 264/630, 631, 264/177.12, 671

(56) References Cited

U.S. PATENT DOCUMENTS

| | | | |
|---|---|---|---|
| 4,253,992 | * | 3/1981 | Soejima et al. .................. 252/477 R |
| 4,434,117 | * | 2/1984 | Inoguchi et al. ...................... 264/630 |
| 4,453,367 | * | 6/1984 | Geyer et al. ............................ 52/806 |
| 4,824,711 | * | 4/1989 | Cagliostro et al. .................. 428/116 |
| 4,992,073 | * | 2/1991 | Levy et al. .............................. 449/44 |

* cited by examiner

Primary Examiner—Christopher A. Fiorilla
(74) Attorney, Agent, or Firm—Pillsbury & Winthrop LLP

(57) ABSTRACT

The present invention provides a production process of a hexagonal honeycomb structure having low deformation of hexagonal cells. This process comprises an extrusion step for obtaining moldings (7) in which partitions (71) are provided in the form of a hexagonal matrix by extrusion molding of a mixed raw material using a horizontal extruder having an extrusion die provided with slits in the form of a hexagonal matrix and in which the direction of extruding is substantially the horizontal direction, a drying step for drying moldings (7), and a baking step for baking moldings (7). The extrusion step is performed such that c axis (700) parallel to two parallel sides (702) and (705) of the six sides (701) through (706) of each hexagon formed by partitions (71) of extruded moldings (7) is substantially vertical relative to the horizontal plane.

5 Claims, 9 Drawing Sheets

- - - - BEFORE DEFORMATION
—— AFTER DEFORMATION

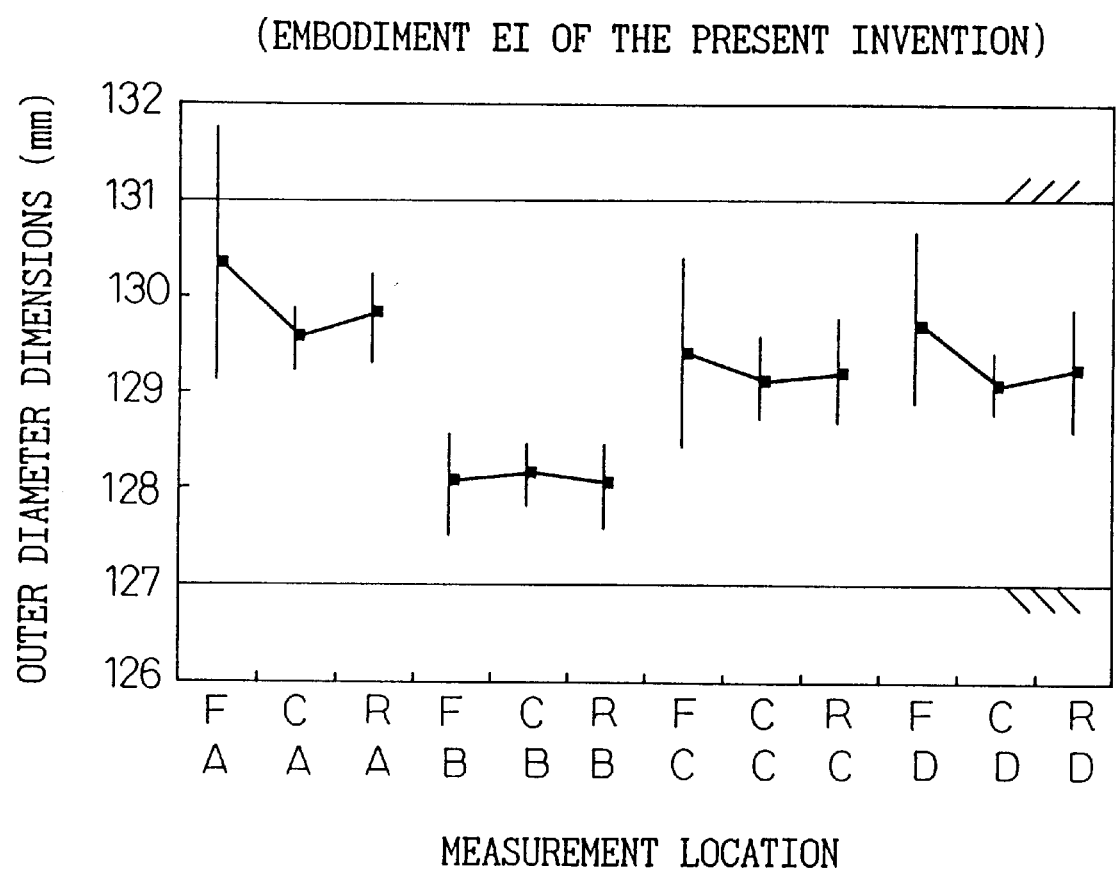

PRODUCTION PROCESS OF A HEXAGONAL HONEYCOMB STRUCTURE

BACKGROUND OF THE INVENTION

1. Field of the Invention

The present invention relates to a production process of a hexagonal honeycomb structure used as a catalyst support and so forth in, for example, an automobile emission purification device.

2. Description of the Related Art

Honeycomb structures made of ceramics having for their main component, for example, cordierite are widely used, for example, as a support for automobile emission purification catalysts. In recent years, the partition thickness of the honeycomb structure has been made thinner to reduce the thermal capacity of the support for the purpose of improving the emission purification performance. In order to maintain the durability of the overall honeycomb structure when reducing partition thickness, it is advantageous to make the cells that compose the honeycomb form hexagonal. Consequently, as shown in FIG. 2 to be described later, development of a hexagonal honeycomb structure 8 in which the shape of cells 80 and partitions 81 is hexagonal has been proceeding.

This hexagonal honeycomb structure can be produced by extrusion molding mixed raw materials using an extruder followed by drying and baking in the same manner as the case of a conventional square honeycomb structure.

However, the production process of the above-mentioned hexagonal honeycomb structure of the prior art has the problems described below.

Namely, in the case of performing each of the above-mentioned production steps of extrusion molding, drying and baking in the state in which the lengthwise direction of the honeycomb structure is in the horizontal direction as has been done in the past, cell deformation in the case of a hexagonal shape is greater than in the case of a square shape. Consequently, the overall dimensional accuracy of the hexagonal honeycomb structure is decreased.

In consideration of the above-mentioned problems of the prior art, the object of the present invention is to provide a production process of a hexagonal honeycomb structure offering low deformation of the hexagonal cells.

SUMMARY OF THE INVENTION

A first aspect of the present invention is a production process of a hexagonal honeycomb structure in which a large number of hexagonal cells are provided surrounded by partitions in the form of a hexagonal matrix comprising:

an extrusion step for obtaining moldings in which partitions are provided in the form of a hexagonal matrix by extrusion molding of a mixed raw material using a horizontal extruder having an extrusion die provided with slits in the form of a hexagonal matrix and in which the direction of extruding is substantially the horizontal direction, a drying step for drying said moldings, and a baking step for baking said moldings, wherein two of the six sides of each hexagon in a cross-section, in which said partitions of the extruded moldings are formed in the above-mentioned extrusion step and which is perpendicular to said direction of extrusion of said honeycomb structure, are parallel, and c axis parallel to these sides is substantially vertical relative to the horizontal plane.

What is most noteworthy in this first aspect of the present invention is that the above-mentioned extrusion process limits the direction of the disposition of the above-mentioned c axis of the extruded moldings to be substantially in the vertical direction as described above.

In order to limit the direction of disposition of the partitions of the moldings in this extrusion step as described above, it is necessary to similarly limit the orientation of the extrusion die in the above-mentioned horizontal extruder. More specifically, the above-mentioned extruder is arranged so that the two sides that compose the hexagons of the above-mentioned slits are parallel and substantially directed in the vertical direction.

In the present invention, the direction of the above-mentioned c axis of the moldings obtained from the above-mentioned extrusion step is substantially the vertical direction. Consequently, the cell shape of moldings can be stabilized and deformation can be inhibited as compared with the case of performing extrusion molding without making the above limitation.

Namely, when considering the case of a force acting from the outside on the sides that composes the hexagons, it is thought that deformation of the hexagon takes place due to a change in the angle of the apex between two sides without hardly any deformation of the side itself. Consequently, as shown in FIG. 1B, in the case of force F acting on hexagon 6 in the direction perpendicular to two parallel sides 61 and 64 (direction perpendicular to the above-mentioned c axis 600), the entire portion L1 between these two sides 61 and 64 is subject to deformation.

In contrast, as shown in FIG. 1A, in the case a force F parallel to two parallel sides 62 and 65 (parallel to the above-mentioned axis c 600) acts on hexagon 6, only the portion other than the above-mentioned two sides 62 and 65, namely the portion equal to ½ the total length of the hexagon in the direction in which force acts (L2+L3) is subject to deformation. Consequently, the amount of deformation in the direction parallel to these two sides in this hexagon is considered to be smaller than in the case of that in other directions.

When this is applied to the above-mentioned moldings during extrusion molding, since moldings are extruded in the horizontal direction as previously mentioned, gravitational force acts in the direction perpendicular to the lengthwise direction (extruding direction), namely the direction that compresses the hexagon from the outside.

Here, in the present invention, the direction of disposition of the slits of the extrusion die is limited as described above, and the direction of the above-mentioned c axis of the resulting moldings is substantially the vertical direction relative to the horizontal plane.

Consequently, the partitions of the above-mentioned moldings are arranged in a state in which the amount of deformation is the lowest with respect to gravitational force. For this reason, a cell shape can be stabilized and deformation can be inhibited as compared with the case of not restricting the direction of disposition of partitions in the moldings. For this reason, the overall dimensional accuracy of the resulting hexagonal honeycomb structure can be stabilized.

Thus, according to the present invention, a production process of a hexagonal honeycomb structure can be provided having low deformation of hexagonal cells.

It is preferable that the above-mentioned c axis of moldings obtained from the above-mentioned extrusion step be within the range of ±10° from the vertical direction. In the case of exceeding ±10° from the vertical direction, there is the problem of the deformation inhibitory effect of the above-mentioned cells not being effectively demonstrated.

It is preferable that, in addition to at least one of either the above-mentioned drying step or baking step being performed horizontally while maintaining the lengthwise direction of the above-mentioned moldings substantially in the horizontal direction, the above-mentioned c axis of the above-mentioned moldings is facing in the substantially vertical direction relative to the horizontal plane.

Namely, among each of the production steps in the above-mentioned production process, the moldings are the softest in the above-mentioned extrusion step and there is the greatest susceptibility to deformation in this step. However, in the case of maintaining moldings so that their lengthwise direction is substantially in the horizontal direction (by being placed horizontally) in the following steps as well, there is an even greater risk of the occurrence of deformation. Consequently, in the case of placing moldings horizontally in the drying or baking step, it is preferable to limit the direction of the above-mentioned c axis of moldings to substantially the vertical direction as previously described. Doing so makes it possible to further inhibit the amount of cell deformation.

When transporting or storing the above-mentioned moldings between any of the above-mentioned extrusion step, drying step or baking step, together with placing the moldings horizontally so that the lengthwise direction of the above-mentioned moldings is maintained substantially in the horizontal direction, it is preferable that the above-mentioned c axis of the above-mentioned moldings be facing in the substantially vertical direction relative to the horizontal plane. In this case, cell deformation that occurs during transport can be inhibited, and dimensional accuracy of the hexagonal honeycomb structure can be further improved.

A second aspect of the present invention is a production process of a hexagonal honeycomb structure in which a large number of hexagonal cells are provided surrounded by partitions in the form of a hexagonal matrix comprising:

an extrusion step for obtaining moldings in which partitions are provided in the form of a hexagonal matrix by extrusion molding of a mixed raw material using an upright extruder having an extrusion die provided with slits in the form of a hexagonal matrix and in which the direction of extruding is substantially the vertical direction, a drying step for drying said moldings, and a baking step for baking said moldings, wherein in at least one of either said drying step or baking step, in addition to being placed horizontally so that the lengthwise direction of said moldings is maintained substantially in the horizontal direction, two of the six sides of each hexagon in a cross-section in which said partitions of the extruded moldings are formed and which is perpendicular to said direction of extrusion of said honeycomb structure are parallel, and c axis parallel to these sides is substantially vertical relative to the horizontal plane.

What is most noteworthy in this aspect is that, in the case of performing this extrusion step using the above-mentioned upright extruder, the direction of disposition of the above-mentioned c axis of the above-mentioned moldings in at least one of either of the following drying step or baking step is limited to the above-mentioned specific direction.

In this case, cell deformation, of which there is the risk of occurring in the case of placing moldings horizontally following the extrusion step, can be inhibited, thereby making it possible to improve the dimensional accuracy of the hexagonal honeycomb structure.

When transporting or storing the above-mentioned moldings between any of the above-mentioned extrusion step, drying step or baking step, together with placing the moldings horizontally so that the lengthwise direction of the above-mentioned moldings is maintained substantially in the horizontal direction, it is preferable that the above-mentioned c axis of the above-mentioned moldings be facing in the substantially vertical direction relative to the horizontal plane. In this case as well, cell deformation that occurs during transport can be inhibited in the same manner as previously described, and dimensional accuracy of the hexagonal honeycomb structure can be further improved.

A third aspect of the present invention is a production process of a hexagonal honeycomb structure in which a large number of hexagonal cells are provided surrounded by partitions in the form of a hexagonal matrix comprising:

an extrusion step for obtaining moldings in which partitions are provided in the form of a hexagonal matrix by extrusion molding of a mixed raw material using a horizontal extruder having an extrusion die provided with slits in the form of a hexagonal matrix and in which the direction of extruding is substantially the horizontal direction, a drying step for drying said moldings, and a baking step for baking said moldings, wherein two of the sides of each hexagon in a cross-section, in which said partitions of the extruded moldings are formed in the above-mentioned extrusion step and which is perpendicular to said direction of extrusion of said honeycomb structure, are parallel, and the orientation of c axis parallel to these sides is in a direction that differs by 60–120° from the orientation of c axis of said moldings in the case of placing said moldings horizontally in at least one of either of said drying step or baking step so that the lengthwise direction of said moldings is maintained substantially in the horizontal direction.

What is most noteworthy in this third aspect of the present invention is that the orientation of the above-mentioned c axis of moldings obtained in the above-mentioned extrusion step, and the orientation of c axis of the above-mentioned moldings in at least one of either the above-mentioned drying step or baking step are intentionally changed to different directions and intentionally control cell deformation of the hexagonal honeycomb structure.

More specifically, in the case of, for example, making the orientation of the above-mentioned c axis of moldings obtained in the extrusion step so that it is facing substantially in the vertical direction, in the following drying step or baking step, the direction of the above-mentioned c axis of the above-mentioned moldings is made to be facing in a direction other than substantially the vertical direction, for example, the above-mentioned c axis is made to face in the horizontal direction (the two sides are in the horizontal direction).

In addition, the orientation of the c axis of the above-mentioned moldings in the above-mentioned extrusion step and its following steps is made to be 60°–120°. If less than 60° or greater than 120°, there is the problem of effects that correct cell deformation occurring during the extrusion step not being fully demonstrated. The orientation is most preferably 90°. In this case, deformation in directions that differ by 90° can be made to occur in the case of the extrusion step and following steps, which is extremely effective in controlling cell deformation.

In the third aspect of the present invention, the orientation of the above-mentioned c axis of the above-mentioned moldings is changed within the range of 60–120° in the extrusion step and following steps as previously described. Consequently, the directions of deformation that is able to occur in the extrusion step and its following steps are such that they mutually cancel out deformation. For this reason, deformation can be applied in a direction in which cell deformation that occurs in the extrusion step can be intentionally reduced.

As a result, instead of simply inhibiting the amount of deformation, corrections can be made intentionally so that the deformation is reduced in the case deformation occurs as a result of the extrusion step.

Thus, according to this third aspect as well, the present invention provides a production process of a hexagonal honeycomb structure in which hexagonal cell deformation is reduced.

BRIEF DESCRIPTION OF THE DRAWINGS

FIG. 9 is an explanatory drawing showing the relationship between measurement location and outer diameter dimensions of embodiment E1 of the present invention in Embodiment 2.

DESCRIPTION OF THE PREFERRED EMBODIMENTS

Embodiment 1

The following provides an explanation of the production process of a hexagonal honeycomb structure in a first embodiment of the present invention using FIGS. 2 through 5.

Figure 1A:
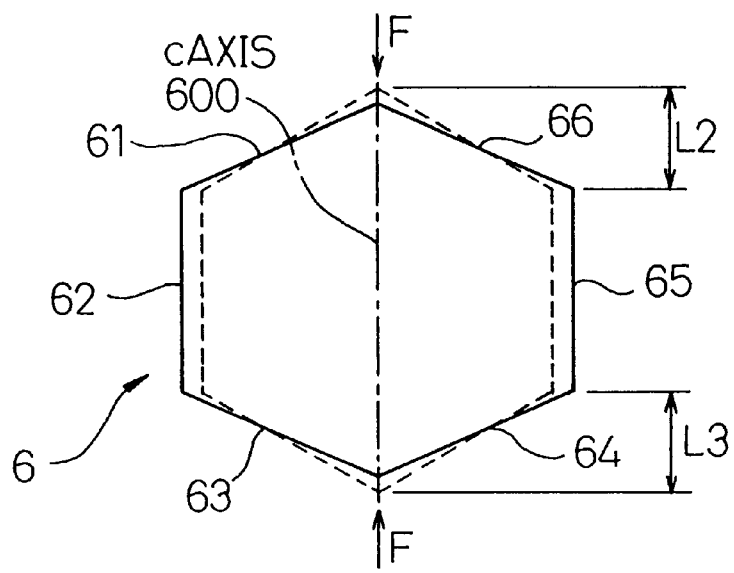
FIG. 1 is an explanatory drawing showing the state of hexagon deformation in the case of stress acting in parallel with c axis (FIG. 1A) and the case of stress acting perpendicular to c axis (FIG. 1B).
Figure 1B:
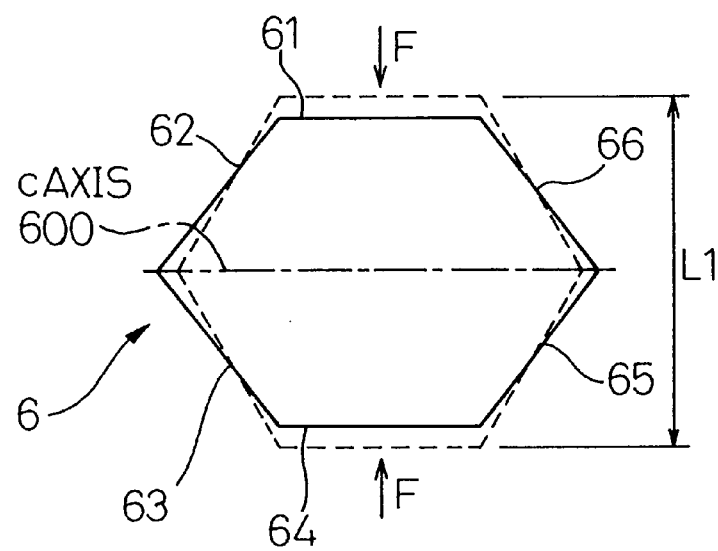
Figure 2:
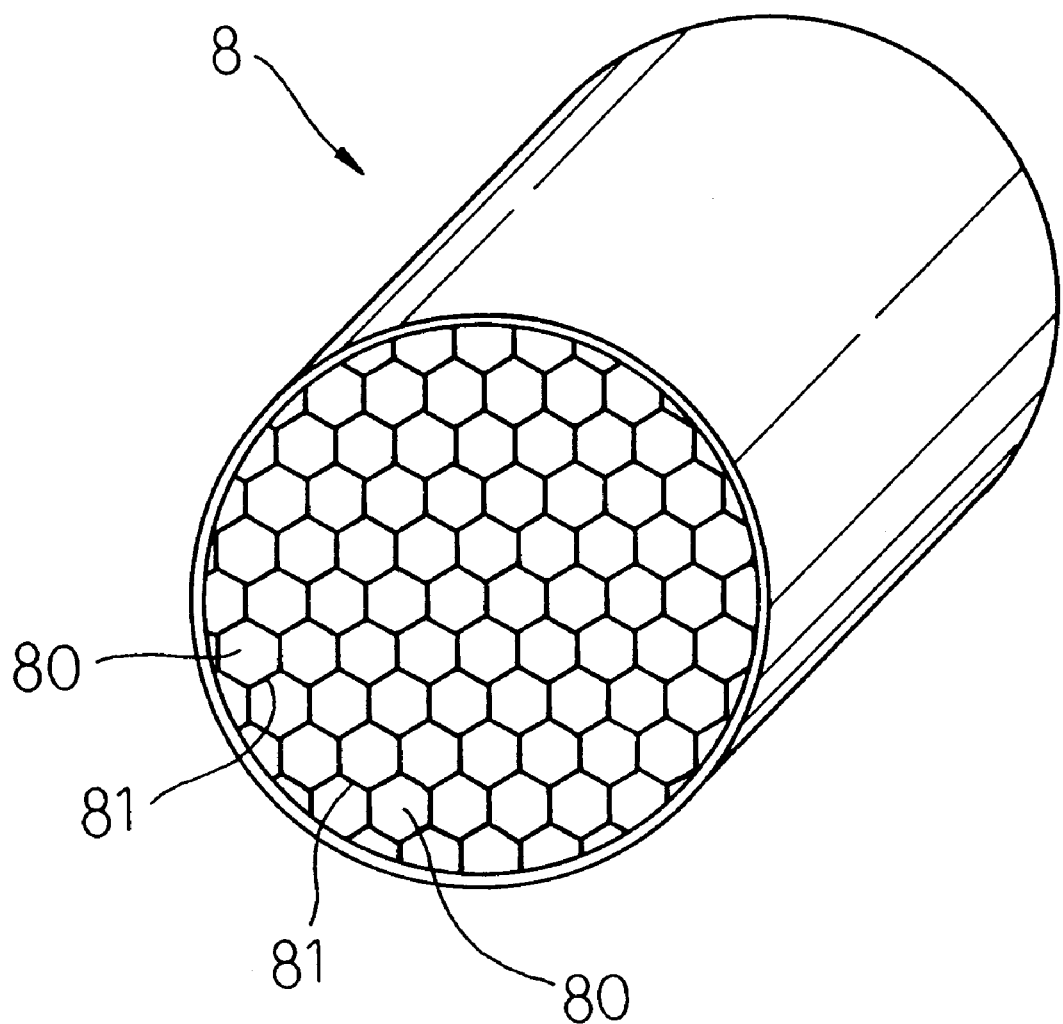
FIG. 2 is a perspective view of the hexagonal honeycomb structure in Embodiment 1.

As shown in FIG. 2, this embodiment comprises a method of producing hexagonal honeycomb structure 8 in which a large number of hexagonal cells 80 are provided surrounded by partitions 81 in the form of a hexagonal matrix. Furthermore, the cell size is enlarged for the sake of explanation in FIG. 2 (and similarly enlarged in FIGS. 4 through 7).

Figure 3:
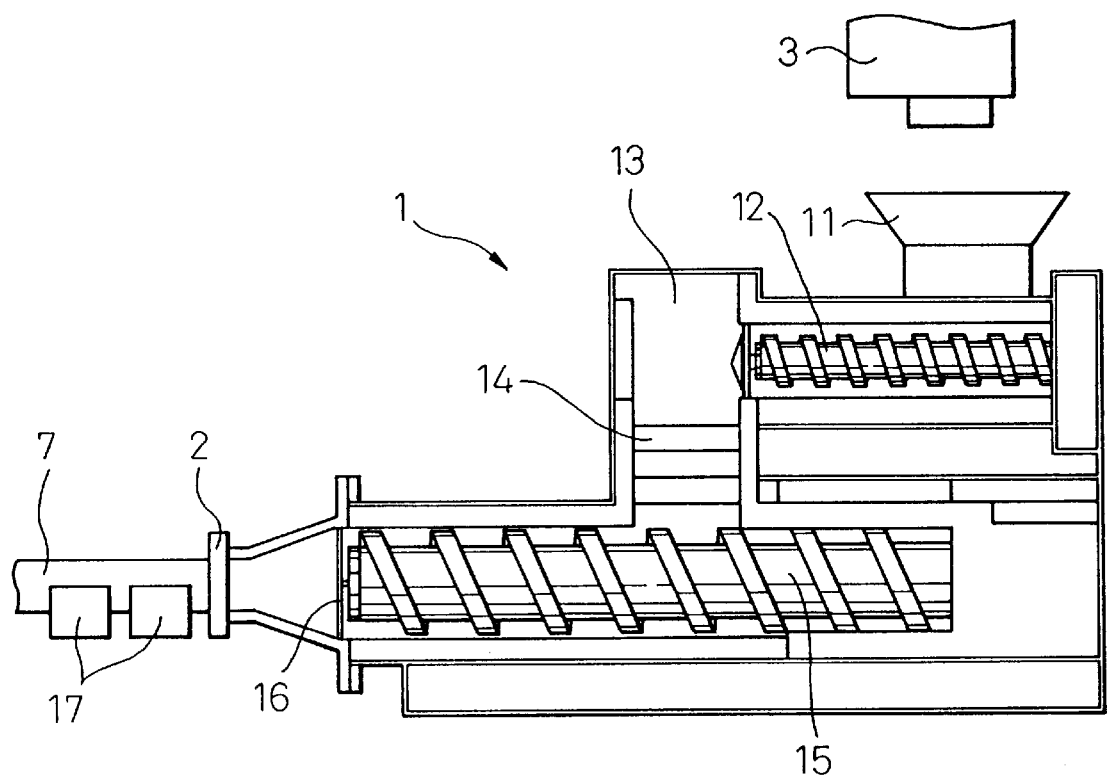
FIG. 3 is an explanatory drawing showing the constitution of horizontal extruder 1 in Embodiment 1.
Figure 4:
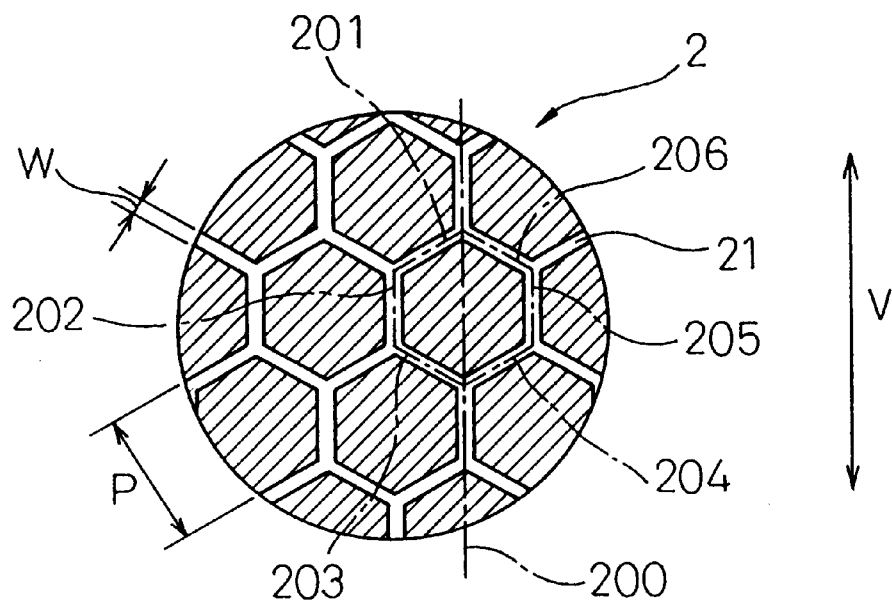
FIG. 4 is a cross-sectional view showing the arrangement of slits in an extrusion die in Embodiment 1.
Figure 5:
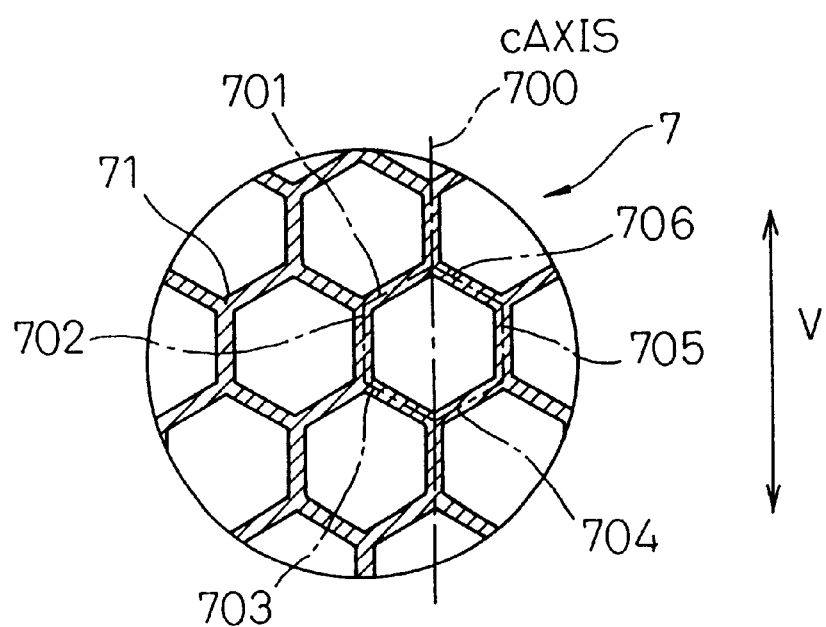
FIG. 5 is a cross-sectional view showing the arrangement of partitions of moldings obtained in an extrusion step in Embodiment 1.

As shown in FIGS. 3 through 5, an extrusion step, in which molding 7 is obtained provided with partitions in the form of a hexagonal matrix by extrusion molding mixed raw materials using a horizontal extruder 1 having extrusion die 2 provided with slits in the form of a hexagonal matrix and in which the direction of extrusion is substantially the horizontal direction, a drying step for drying the above-mentioned molding 7, and a baking step for baking the above-mentioned molding 7, were carried out.

As shown in FIG. 5, the above-mentioned extrusion stop was carried out with c axis 700, which is parallel with two parallel sides 702 and 705 of the six sides 701 through 706 of each hexagon formed by the above-mentioned partitions 71 of the resulting molding 7, facing substantially in vertical direction V relative to the horizontal plane.

The following provides a detailed explanation of this.

Hexagonal honeycomb structure 8 produced by the present embodiment uses, as its main component, cordierite having a theoretical composition represented by $2MgO \cdot 2Al_2O_3 \cdot 5SiO_2$. Normally, cordierite contains $SiO_2$ in the ratio of 49.0–53.0 wt %, $Al_2O_3$ in the ratio of 33.0–37.0 wt %, and MgO in the ratio of 11.5–15.5 wt %.

A raw material in which molding assistant is added and mixed with cordieriting raw material adjusted to have the desired cordierite composition is used for the raw material of this hexagonal honeycomb structure.

Examples of cordieriting raw materials include talc $(Mg_3Si_4O_{10}(OH)_2)$, kaolin $(Al_2Si_2O_5(OH)_4)$, alumina $(Al_2O_3)$ and aluminum hydroxide $(Al(OH)_3)$. In addition, oxides, hydroxides and chlorides that serve as sources of Mg, Al and Si can also be used, examples of which include serpentine $(Mg_3Si_2O_5(OH)_4)$, pyroferrite $(Al_2Si_4O_1(OH)_2)$ and brucite $(Mg(OH)_2)$.

In addition, normally used lubricants, moisture retention agents and binders can be used for the molding assistants added to the cordieriting raw materials. Examples of lubricants and moisture retention agents include wax, water-soluble polyvalent alcohol derivatives and surface activators. Examples of the above-mentioned binders include methylcellulose and polyvinyl alcohol.

Next, as shown in FIG. 3, the above-mentioned cordieriting raw material and molding assistant are mixed by mixer 3 and extruded in an extrusion step using horizontal extruder 1.

As shown in the same drawing, horizontal extruder 1 has raw material loading port 11 in opposition to mixer 3 provided above, along with upper stage screw 12 and lower stage screw 15 below. Vacuum chamber 13 and toothed roller 14 are provided between upper stage screw 12 and lower stage screw 15. Filtering mesh 16 is provided in front of lower stage screw 15 to make the flow of raw material uniform, and extrusion die 2 is arranged in front of filtering mesh 16. sponge receiving pads 17 are provided in front of extrusion die 2 to support the sides of the extruded moldings.

As shown in FIG. 4, extrusion die 2 in the present embodiment has slits 21 in the form of a hexagonal matrix. As shown in the same drawing, this extrusion die 2 was installed on horizontal extruder 1 so that c axis 200 parallel to two parallel sides 202 and 205 of the six sides 201 through 206 of each hexagon formed by slits 21 faces substantially in the vertical direction.

Width w of slits 21 was 0.15 mm, and pitch P of each hexagon was 1.36 mm.

A guide ring (not shown) that defines the dimensions of outer diameter of molding 7 was provided on extrusion die 2. Its inner diameter was 138 mm in the present embodiment.

In the carrying out of an extrusion step using this horizontal extruder 1, raw material is loaded into raw material loading port 11 from the above-mentioned mixer 3. This is then fed to lower stage screw 15 by way of vacuum chamber 13 and toothed roller 14 by the driving force produced by rotation of upper stage screw 12. Finally, molding 7 is extruded from extrusion die 16 by the driving force produced by rotation of lower stage screw 15. The extruded molding 7 is fed towards the front while being supported by the above-mentioned sponge receiving pads 17.

Here, molding 7, extruded in this extrusion step, is in a form to which the shape of the slits of extrusion die 2 have been transcribed. Consequently, the c axis parallel to two parallel sides 702 and 705 of the six sides 701 through 706 of each hexagon formed by the formed partitions 71 is facing in substantially vertical direction V.

Next, after the extrusion step, the above-mentioned molding 7 is cut to a prescribed length while still held on the above-mentioned sponge receiving pads 17. Each separated molding 7 was allowed to stand for 1 hour while still held on sponge receiving pads 17. Namely, in addition to placing molding 7 horizontally such that the lengthwise direction of molding article 7 was maintained in substantially the horizontal direction, a drying step was carried out for 1 hour with the above-mentioned c axis 700 of molding 7 facing in substantially the vertical direction V.

Next, after completion of the drying step, molding 7 placed on sponge receiving pads 17 was transported to a baking oven were baking was carried out. Baking was carried out under conditions of holding at a temperature of 1400° C. for 5 hours.

Furthermore, although the above-mentioned transport and baking steps were carried out horizontally, the orientation of the hexagons formed by partitions 71 was not controlled and left to be random. In addition, the orientation of the partitions of molding 7 after the baking step was also not controlled and left to be random.

Following completion of the baking step, a finishing step was carried out involving, for example, removing the cut ends of each molding 7 to obtain hexagonal honeycomb structure 8.

In the production process of the present embodiment, the direction of disposition of c axis 700 of molding 7 supplied to the above-mentioned extrusion and drying steps is limited to substantially vertical direction V. Namely, in these two steps, two sides 702 and 705 of the six sides 701 through 706 of each hexagon formed by partitions 71 of molding 7 are facing substantially in the vertical direction V.

Consequently, during extrusion molding, work is carried out in the state in which the amount of cell deformation with respect to gravitational force acting on molding 7 is the lowest. For this reason, cell deformation in the extrusion step can be reliably inhibited in comparison to the case of not restricting the direction of disposition of the partitions of the molding in any way.

Next, cell deformation can be stabilized and deformation can be inhibited in comparison to the case of not restricting the direction of disposition of the partitions of the molding in any way in the drying step as well for the same reasons as in the case of the above-mentioned extrusion step.

As a result of intentionally managing the direction of placement of the molding, the resulting hexagonal honeycomb structure 8 had less deformation in comparison with the prior art.

Furthermore, the direction of disposition of partitions of moldings in steps following the drying step was not controlled in the present embodiment. However, since these steps were carried out after the moldings had solidified in the above-mentioned drying step, this is not considered to have much effect.

Embodiment 2

In this embodiment, a hexagonal honeycomb structure 8 (embodiment E1 of the present invention) was fabricated in the same manner as Embodiment 1, comparative article C1, in which a portion of the production process was changed, was fabricated, and the dimensions of each part were measured to quantitatively evaluate the effects of Embodiment 1.

Figure 6:
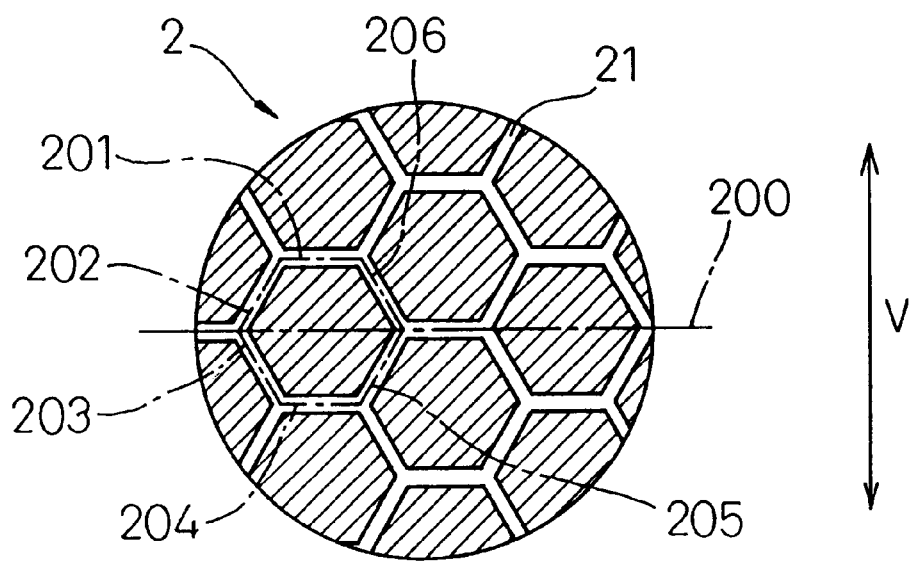
FIG. 6 is a cross-sectional view showing the arrangement of slits in an extrusion die for molding of comparative article C1 in Embodiment 2.

With respect to comparative article C1, as shown in FIG. 6, extrusion die 2 in horizontal extruder 1 was fabricated by changing by 90° the direction of disposition of the c axis 200 of slits 21 in the form a hexagonal matrix. More specifically, extrusion die 2 in the case of comparative article C1 was installed in horizontal extruder 1 so that two parallel sides 201 and 204 of the six sides 201 through 206 of each hexagon formed by slits 21 are facing in the substantially horizontal direction as shown in FIG. 6.

Figure 7:
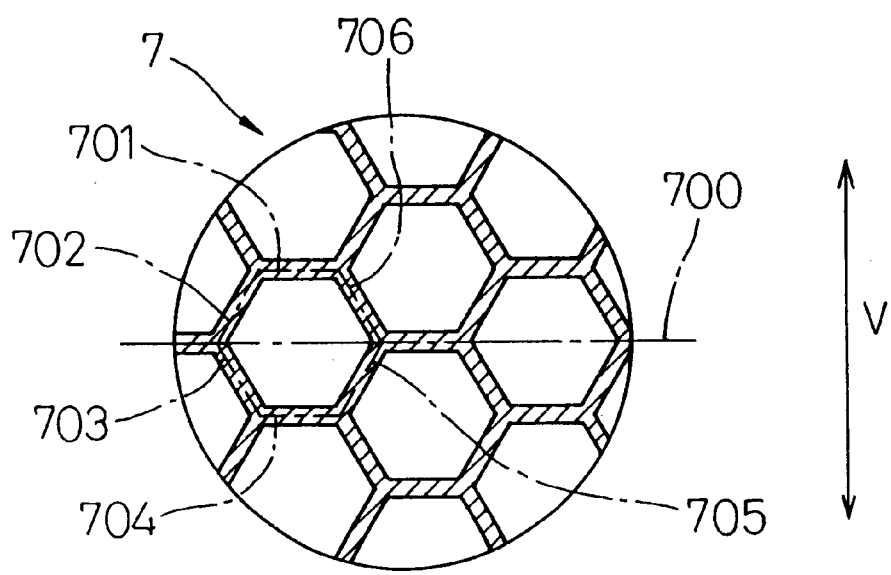
FIG. 7 is a cross-sectional view showing the arrangement of partitions in moldings obtained in the extrusion step of comparative article C1 in Embodiment 2.

In the extrusion step, extrusion was performed such that the above-mentioned c axis 700 of extruded molding 7 is facing in the substantially horizontal direction as shown in FIG. 7. In addition, accompanying this change, the following drying step was also performed so that c axis 700 of molding 7 is facing in substantially the horizontal direction. Other matters were the same as in Embodiment 1 (embodiment E1 of the present invention).

Figure 10:
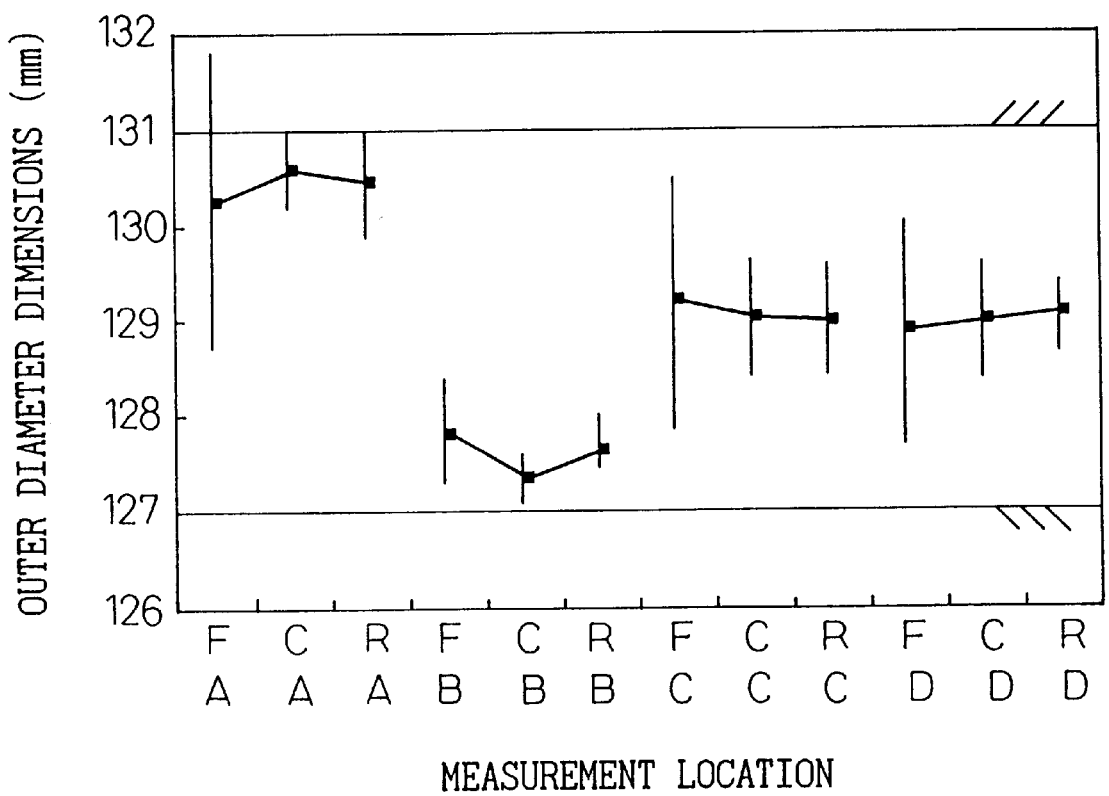
FIG. 10 is an explanatory drawing showing the relationship between measurement location and outer diameter dimensions of comparative article C1 in Embodiment 2.

The results of measuring the dimensions of embodiment E1 of the present invention and comparative article C1 are shown in FIGS. 9 and 10.

Figure 8A:
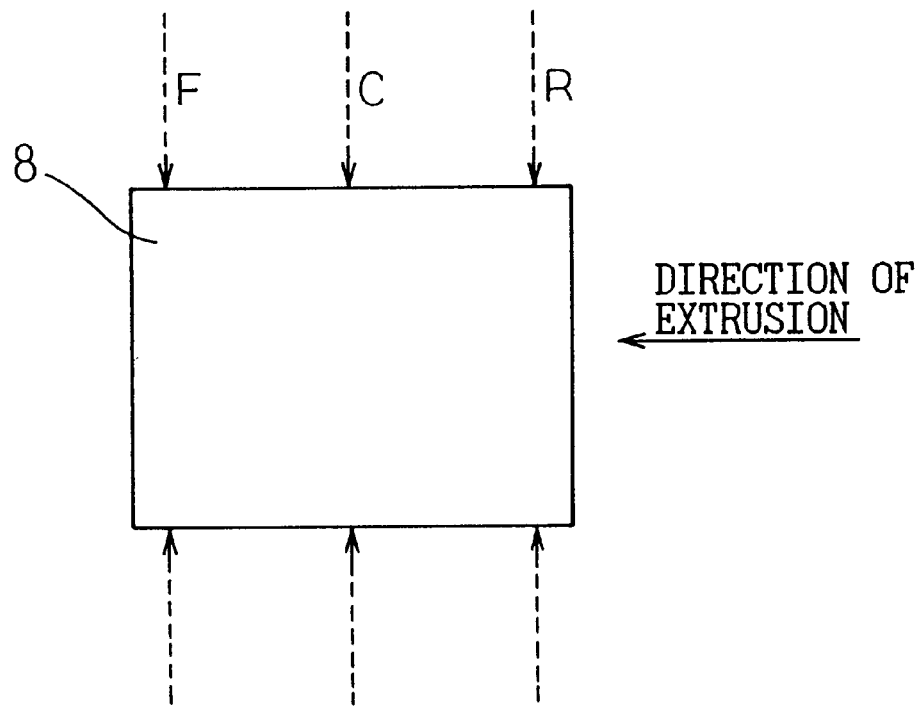
FIG. 8 is an explanatory drawing respectively showing the locations of outer diameter measurement from the side (FIG. 8A) and from the front (FIG. 8B) in Embodiment 2.
Figure 8B:
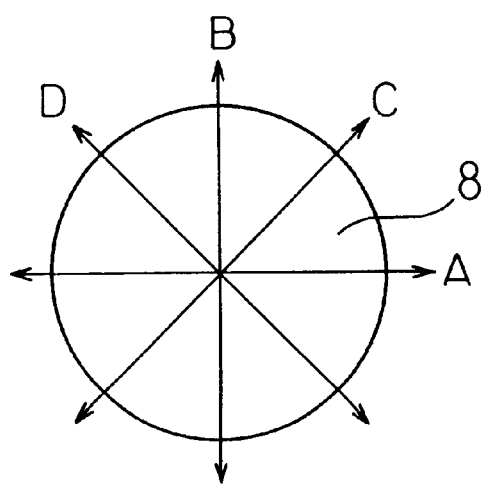

FIGS. 8A and 8B show the locations where the above-mentioned dimensions were measured. As shown in FIG. 8A, measurements were made at three locations (front portion, center portion and rear portion) in the direction of extrusion (lengthwise direction) of hexagonal honeycomb structure 1. In this drawing, reference numbers F, C and R indicate the front, center and rear portions, respectively. As shown in FIG. 8B, measurements were made at four locations in the direction of circumference in the horizontal direction A, vertical direction B, in the direction 45° to the right C as viewed from the front, and in the direction 45° to the left D as viewed from the front based on the arranged state in the extrusion step.

20 samples each of embodiment E1 of the present invention and comparative article C1 were prepared, and each measurement was made 20 times.

The mean of measurement results (n=20) is shown in FIG. 9 for embodiment E1 of the present invention, and in FIG. 10 for comparative article C1. In these drawings, measurement location is plotted on the horizontal axis, while outer diameter (mm) is plotted on the vertical axis. Reference numerals (F), (C) and (H) on the horizontal axis represent the front portion, center portion and rear portion, respectively, in the same manner as previously described.

As can be determined from these drawings, the difference in outer diameter between horizontal direction A and vertical direction B is smaller for embodiment E1 of the present invention than comparative article C1.

As shown in Table 1, the difference in mean values between horizontal direction A and vertical direction B is considerably smaller in the case of the embodiment of the present invention. The deformation ratio (%) in Table 1 shows the deformation ratio (%) which is mean value of the amount of deformation A to the inner diameter of 138 mm of the guide ring in extrusion die 2—mean value of the amount of deformation B to the inner diameter of 138 mm of the guide ring in extrusion die 2.

TABLE 1

|  | Mean value of A – Mean value of B (mm) | Deformation ratio (%) |
|---|---|---|
| Embodiment E1 | 1.87 | 1.36 |
| Comparative Article C1 | 2.88 | 2.09 |

On the basis of the above results, embodiment E1 of the present invention, in which c axis 700 of molding 7 obtained in the above-mentioned extrusion step and drying step is facing in substantially the vertical direction V, was determined to significantly inhibit the amount of cell deformation in comparison with comparative article C1, in which c axis 700 of molding 7 is facing in substantially the horizontal direction.

Embodiment 3

Figure 11:
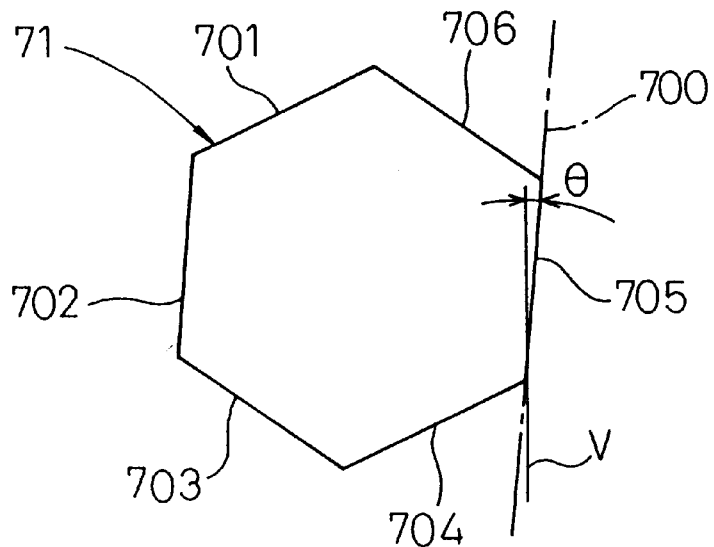
FIG. 11 is an explanatory drawing showing the shift angle $\theta$ of the above-mentioned c axis from the vertical direction in moldings obtained from an extrusion step in Embodiment 3.

In the present embodiment, as shown in FIG. 11, the deformation ratio of cell form was measured relative to a shift angle θ in the case of shifting the direction of c axis 700 of the hexagon formed by partitions 71 of the above-mentioned molding 7 (same direction as side 705) in the extrusion step and drying step of Embodiment 1 from the vertical direction V.

Figure 12:
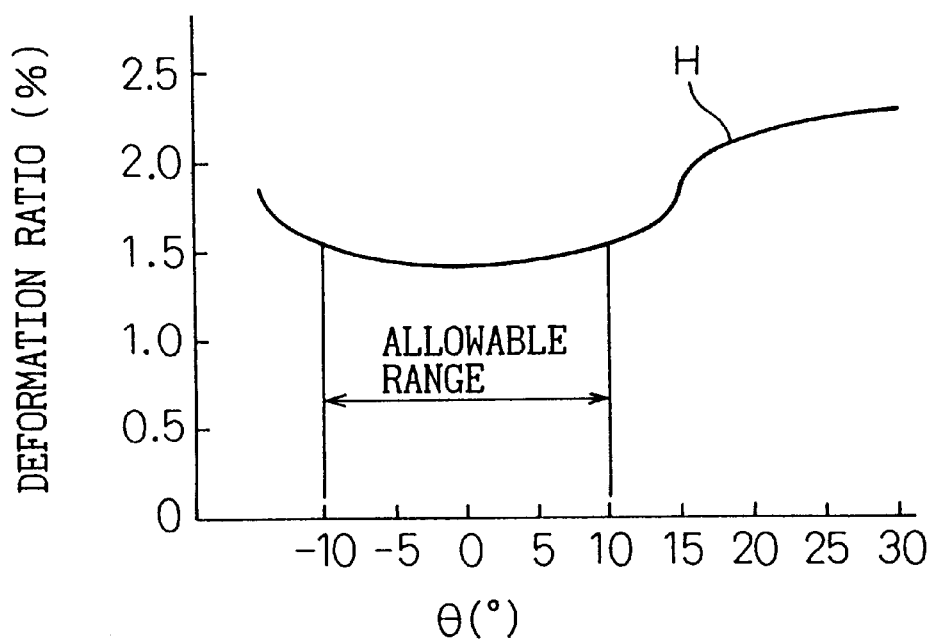
FIG. 12 is a graph showing the relationship between shift angle $\theta$ and the amount of cell deformation in Embodiment 3.

Measurement results are shown in a graph in FIG. 12. In this graph, the above-mentioned shift angle θ (°) was plotted on the horizontal axis, while the above-mentioned deformation ratio (%) was plotted on the vertical axis. The measured values of deformation ratio are shown by curve H.

As can be seen from the above graph, in the case of the above-mentioned shift angle of ±10°, cell deformation remains stable and at a low level.

What is claimed is:

1. A production process of a hexagonal honeycomb structure in which a plurality of hexagonal cells are provided surrounded by partitions in the form of a hexagonal matrix comprising:

an extrusion step for obtaining a molding in which partitions surrounding a large number of hexagonal cells are provided in the form of a hexagonal matrix by extrusion molding of a mixed raw material using a horizontal extruder having an extrusion die provided with slits in the form of a hexagonal matrix and in which the direction of extruding is substantially a horizontal direction parallel to a horizontal plane, a drying step for drying said molding, and a baking step for baking said molding, wherein two partitions of each hexagonal cell are substantially vertical to the horizontal plane and parallel to an axis during the extruding step.

2. A production process of a hexagonal honeycomb structure according to claim 1, wherein said axis is within the range of ±10° from the vertical direction.

3. A production process of a hexagonal honeycomb structure according claim 1, wherein in addition to at least one of either of said drying step or said baking step being performed horizontally while maintaining the lengthwise direction of said molding substantially in the horizontal direction, said two partitions of each hexagonal cell are substantially vertical relative to the horizontal plane.

4. A production process of a hexagonal honeycomb structure according claim 1, wherein when transporting or storing said molding between any of said extrusion step, drying step or baking step, together with placing the molding horizontally so that the lengthwise direction of said molding is maintained substantially in the horizontal direction, said two partitions of each hexagonal cell of said molding are substantially vertical relative to the horizontal plane.

5. A production process of a hexagonal honeycomb structure in which a large number of hexagonal cells are provided surrounded by partitions in the form of a hexagonal matrix comprising:

an extrusion step for obtaining a molding in which partitions surrounding a large number of hexagonal cells are provided in the form of a hexagonal matrix by extrusion molding of a mixed raw material using a horizontal extruder having an extrusion die provided with slits in the form of a hexagonal matrix and in which the direction of extruding is substantially a horizontal direction parallel to a horizontal plane, a drying step for drying said molding, and a baking step for baking said molding, wherein two partitions of each hexagonal cell are substantially vertical to the horizontal plane and parallel to an axis during the extruding step, and the orientation of the two partitions differ by 60–120° from the orientation of the two partitions in the case of placing said molding horizontally in at least one of either of said drying step or said baking step so that the lengthwise direction of said molding is maintained substantially in the horizontal direction.

* * * * *